US012578453B2

(12) United States Patent
Hakobyan et al.

(10) Patent No.: US 12,578,453 B2
(45) Date of Patent: Mar. 17, 2026

(54) SYSTEM AND METHOD OF DETERMINING A RELATIVE RADIAL VELOCITY OF A RADAR TARGET

(71) Applicant: WAVEYE, INC., Palo Alto, CA (US)

(72) Inventors: Gor Hakobyan, Schoenaich (DE);
Levon Budagyan, Palo Alto, CA (US);
Narek Rostomyan, San Diego, CA
(US)

(73) Assignee: WAVEYE, INC., Palo Alto, CA (US)

( * ) Notice: Subject to any disclaimer, the term of this patent is extended or adjusted under 35 U.S.C. 154(b) by 309 days.

(21) Appl. No.: 18/212,397

(22) Filed: Jun. 21, 2023

(65) Prior Publication Data

US 2024/0427000 A1 Dec. 26, 2024

(51) Int. Cl.
G01S 13/58 (2006.01)
G01S 7/03 (2006.01)

(52) U.S. Cl.
CPC .............. G01S 13/583 (2013.01); G01S 7/03 (2013.01)

(58) Field of Classification Search
CPC ...... G01S 13/583; G01S 13/42; G01S 13/931; G01S 7/03
See application file for complete search history.

(56) References Cited

U.S. PATENT DOCUMENTS

| | | | | |
|---|---|---|---|---|
| 10,637,530 B1 * | 4/2020 | Levitan | ................. | G01S 13/428 |
| 2006/0025897 A1 * | 2/2006 | Shostak | ............. | G06K 19/0717 |
| | | | | 701/1 |
| 2018/0267157 A1 * | 9/2018 | Guruprasad | ............ | G01S 11/12 |
| 2021/0333386 A1 * | 10/2021 | Park | ......................... | G01S 7/356 |
| 2021/0405183 A1 * | 12/2021 | Vossiek | .................. | G01S 13/87 |
| 2023/0128469 A1 * | 4/2023 | Garrity | ................. | G01S 13/347 |
| | | | | 342/129 |

* cited by examiner

*Primary Examiner* — Jack W Keith
*Assistant Examiner* — Clayton Paul Ridder
(74) *Attorney, Agent, or Firm* — Duane Morris LLP

(57) ABSTRACT

A method and system of determining a relative radial velocity of a radar target by operating a radar sensor having a plurality of multiplexed transmission channels, wherein modulated transmission signals are sent in repeated multiplex sequences in which the transmission signals sent in different transmission channels have a predetermined spread in at least one of a time, frequency, and phase domain, and the velocity of the target is inferred from a Doppler-induced phase progression of the received signals, the method including the steps of: switching between at least two multiplex sequences which differ in the spread between the transmission channels and thereby induce different phase progressions; and inferring the velocity of the target from the differences between said phase progressions.

20 Claims, 8 Drawing Sheets

SYSTEM AND METHOD OF DETERMINING A RELATIVE RADIAL VELOCITY OF A RADAR TARGET

BACKGROUND

Modern vehicles are equipped with advanced driver assistance systems that rely on environment perception based on surround sensors to enable a computing system to plan and safely execute maneuvers or to navigate to a desired destination. Radar is one of the sensing modalities utilized to perceive the vehicle's surroundings for both safety and comfort for the driver. Radar transmits electromagnetic waves that are subsequently reflected by objects in the vehicle's surroundings. A radar receiver receives the reflected waves and uses them for target detection as well as for angle of arrival (azimuth and elevation) estimation of the reflected waves. Moreover, the reflected waves enable an estimation of the target's distance and relative velocity.

The use of frequency modulated continuous wave (FMCW) waveforms, in the form of linear frequency chirps, is a common practice in contemporary automotive radars due to low cost of production and a near negligible blind range. Upon reception of reflected echoes, the receive (Rx) chirps, which have undergone a time delay and attenuation, are mixed with the transmit (Tx) chirp. This mixture results in a delay-induced constant frequency offset, commonly referred to as a beat frequency. For example, if the target is moving in relation to the radar, the beat frequency will contain an additional Doppler shift. To accurately determine the range and Doppler shift of the target, an additional measurement is required.

To address the need for additional measurements, the state-of-the-art radar sensors use chirp-sequence modulation, in which a sequence of chirps with an identical slope is transmitted and reflections from the targets in the vehicle's environment are processed to generate range-Doppler maps. Fast Fourier transformation (FFT) based range processing, also called fast-time, is applied to individual received chirps yielding a range spectrum. The Doppler shift processing is carried out over the consecutive chirps, also called slow-time, resulting in a Doppler spectrum.

Conventional radar signal processing performs target detection on the generated range-Doppler maps. Upon detection of the targets, angular estimation is performed through array processing of signals from multiple spatial channels, for instance, from multiple receive antennas. The angular resolution is directly proportional to the aperture size of the antenna array.

Modern radars use so called multiple-input multiple-output (MIMO) radar architecture, where multiple antennas are utilized both on the Tx and Rx side. Angular processing at the receiver is done by rearranging the paths between the transmitter, target and the receiver for every Tx-Rx combination into a virtual array with equivalent path lengths. Such an array can then be processed by using conventional angle estimation methods.

For a MIMO radar, however, multiplexing of the Tx channels is required, such that the signals of different Tx channels can be distinguished at the receiver. Multiplexing of the Tx channels for a MIMO radar can be done in time, frequency, or using code-division. In case of time division multiplex (TDM) there is a spread between the Tx channels in the time domain. In case of frequency division multiplex (FDM) there is a spread between the Tx channels in the frequency domain, and in case of code division multiplex (CDM) there is a spread between the Tx channels in the phase domain.

FDM and CDM require a significantly more complex radar frontend hardware given the parallel operation of Tx channels. Hence, TDM is commonly utilized in automotive MIMO radars. An alternative method for multiplexing Tx channels, known as Doppler division multiplexing (DDM), uses the unambiguously measurable Doppler range to multiplex the Tx channels. This is done by coding an additional Doppler shift on every channel that allows to distinguish the signals from different Tx channels at the receiver.

The TDM of the Tx channels leads to Doppler ambiguities in the range-Doppler processing. As the time interval between chirps in a sequence that belong to the same Tx channels is increased, the sampling frequency in the Doppler processing is decreased. This leads to aliasing in the form of Doppler ambiguities. The reduction of the unambiguous Doppler range means that the target velocity cannot be determined unambiguously. Additionally, since TDM interleaving introduces a time offset between the transmissions of Tx channels, the Doppler component in the phase of the Tx channels cannot be correctly compensated prior to angle processing, as the true velocity of the target is unknown.

Analogously to TDM, DDM introduces a reduction of the unambiguous Doppler range, which needs to be recovered with additional processing. More generally, in order to perform unambiguous Doppler measurements in a large velocity range, the repetition frequency of the modulation sequences or chirps should be proportionally high which, however, imposes a high demand on the hardware of the radar frontend and on the processing power. On the other hand, when the repetition frequency is decreased, ambiguities in the Doppler measurement will be induced.

Thus, current methods and systems for reducing Doppler ambiguity for TDM-MIMO radars are not satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompanied drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In some embodiments, the Doppler ambiguity resolution is performed jointly with a target's angle estimation. In some embodiments, methods and systems for the unambiguous determining a relative radial velocity of a radar target are disclosed. In some embodiments, the method includes operating a radar sensor having a plurality of multiplexed transmission channels, wherein modulated transmission signals are sent in repeated multiplexed sequences, and wherein the transmission signals sent in different transmission channels have a predetermined spread in at least one of a time, frequency, and/or phase domain, and the velocity of the target is inferred from a Doppler-induced phase progression of the received signals.

In some embodiments, a radar sensor and a radar signal processing method provides a driver assistance, a collision avoidance, or automated driving systems of an automotive vehicle (AV).

In some embodiments, a method and system include a radar sensor with multiple transmit channels that obtains unambiguous velocity measurement with low computational complexity. In some embodiments, a method for determining a relative radial velocity of a target comprises the steps of: switching between at least two multiplex sequences which differ in the spread between the transmission channels such that the Doppler-effect induces different phase progressions, and inferring the velocity of the target from the differences between said phase progressions. In some embodiments, if a plurality of transmission antennas of the radar sensor are spatially offset from one another in a certain direction, e.g., the horizontal direction, then the phase shift between received signals from different transmission channels is dependent upon the azimuth angle of the target. If the target is moving, there is an additional phase progression that is proportional to the spread between the two channels and to the velocity of the target. In other words, the spread between the channels induces an extra phase shift that can be considered as a Doppler shift. This makes it difficult to separate the effect caused by the azimuth angle from the effect caused by the movement of the target. In some embodiments, it is possible to compare the phase progression obtained with one multiplex sequence to the phase progression obtained with another multiplex sequence for the same pairs of transmission and receiving channels. Subsequently, it is easy to separate the two effects from one another because the spatial configuration of the antenna is the same in both cases, so that the phase shift depends only on the velocity and the spread difference but not on the angle. Thus, only two modulation sequences or chirps with different multiplex sequences are sufficient for unambiguously determining the target velocity.

According to some embodiments, the present disclosure proposes a system design and signal processing method for the operation of a multiple-input multiple-output (MIMO) radar. In accordance with various embodiments, the present disclosure enables an effective operation of a substantial number of transmission (Tx) channels. Additionally, the present disclosure provides methods for resolving the Doppler ambiguity in a standalone step, distinct from the angular processing procedure, in accordance with some embodiments. The invention thereby achieves a robust resolution of Doppler ambiguity without imposing an excessive computational burden.

In accordance with some embodiments, the invention disclosed herein can be used for implementing a radar network with multiple radar sensors operating cooperatively. Similar to single MIMO radar applications, the radar network comprising multiple cooperative radars (e.g., radars sharing information in real or close to real time with each other, or capable of processing signals transmitted from another radar in the same cooperative radar network) can be multiplexed, and the multiplexing-induced Doppler ambiguity can be resolved.

In some embodiments, a transmission scheme produces two sequences, one of which induces a positive Doppler shift to the angular spectrum and the other introducing a negative shift. The processing to resolve the Doppler ambiguity may include the convolution of two angular spectra, which results in a spectral peak corresponding to an amount of the Doppler shift between these two spectra.

An exemplary advantage of some embodiments is that they requires less computational resources, while being more robust to resolving Doppler ambiguities compared to prior approaches. Other advantages include a reduction in number of Doppler ambiguities for a specified number of transmit (Tx) channels. Further advantages include a high capacity for multiplexing a large number of Tx channels, thereby enabling realization of a large MIMO array.

In accordance with some embodiments, an advantageous multiplexing scheme and signal processing approach for a MIMO radar sensor are disclosed. The approach can be implemented with arbitrary radar waveforms capable of coherent range, Doppler, and angular estimation. An exemplary approach is described based on the example of a chirp-sequence radar with time division multiplexing, although it is equally applicable to other radar waveforms such as orthogonal frequency division multiplexing (OFDM), phase-modulated continuous wave (PMCW), and others, and can also be used with other multiplex concepts.

In some embodiments, to keep the number of Doppler ambiguities to a minimum, two sequences with a code-time interval equal to the chirp-repetition interval in both forward and reverse transmission sequences can be used. Alternative realizations with a different code-time interval for the sequences are possible, especially if operation with more than two sequences is desired.

In some embodiments, sequences in code-time are transmitted from the same Tx array. For example, for operation with a forward and reverse sequence, the number of Doppler ambiguities in slow-time becomes double the number of multiplexed Tx antennas. In an alternative embodiment, the sequences can be transmitted from two different arrays with the same spacing, e.g., from two rows of uniformly spaced linear Tx arrays. In this case, the number of Doppler ambiguities introduced in slow-time processing is equal to the number of multiplexed Tx channels or antenna elements, which is optimal with respect to the number of slow-time ambiguities.

In an alternative embodiment, instead of a TDM multiplexing scheme, other multiplexing methods such as Doppler Division Multiplexing or Code-Division Multiplexing can be used in combination with a MIMO radar sensor. In the case of Doppler Division Multiplexing or Code-Division Multiplexing, the Doppler shifts are induced for the coded wave-forms, such that from two or more such sequences the Doppler ambiguity can be resolved analogous to the TDM case.

In accordance with various embodiments, MIMO radar methods and techniques can be utilized for arbitrary antenna array geometries, including planar arrays. When operated with code-time sequences being transmitted from different antenna array elements, the antenna array geometry for both sequences needs to exhibit the same spacing between the antenna elements, such that the angular spectrum obtained from both sequences has the same shape (except for the Doppler-induced shift). In some embodiments, the Tx antenna array is a uniform linear array. In this case, two rows of a linear Tx array can be operated without any redundancy in the code-time (i.e. number of Tx antennas is equal to the number of code-time samples).

In one embodiment, the induced Doppler shifts in code-time are constant frequencies induced by equidistant transmission intervals. In other embodiments, the effect of Doppler shifts may be realized as non-equidistant Doppler-induced phase progression. This can be realized through non-equidistant time intervals in code-time.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Figure 1:
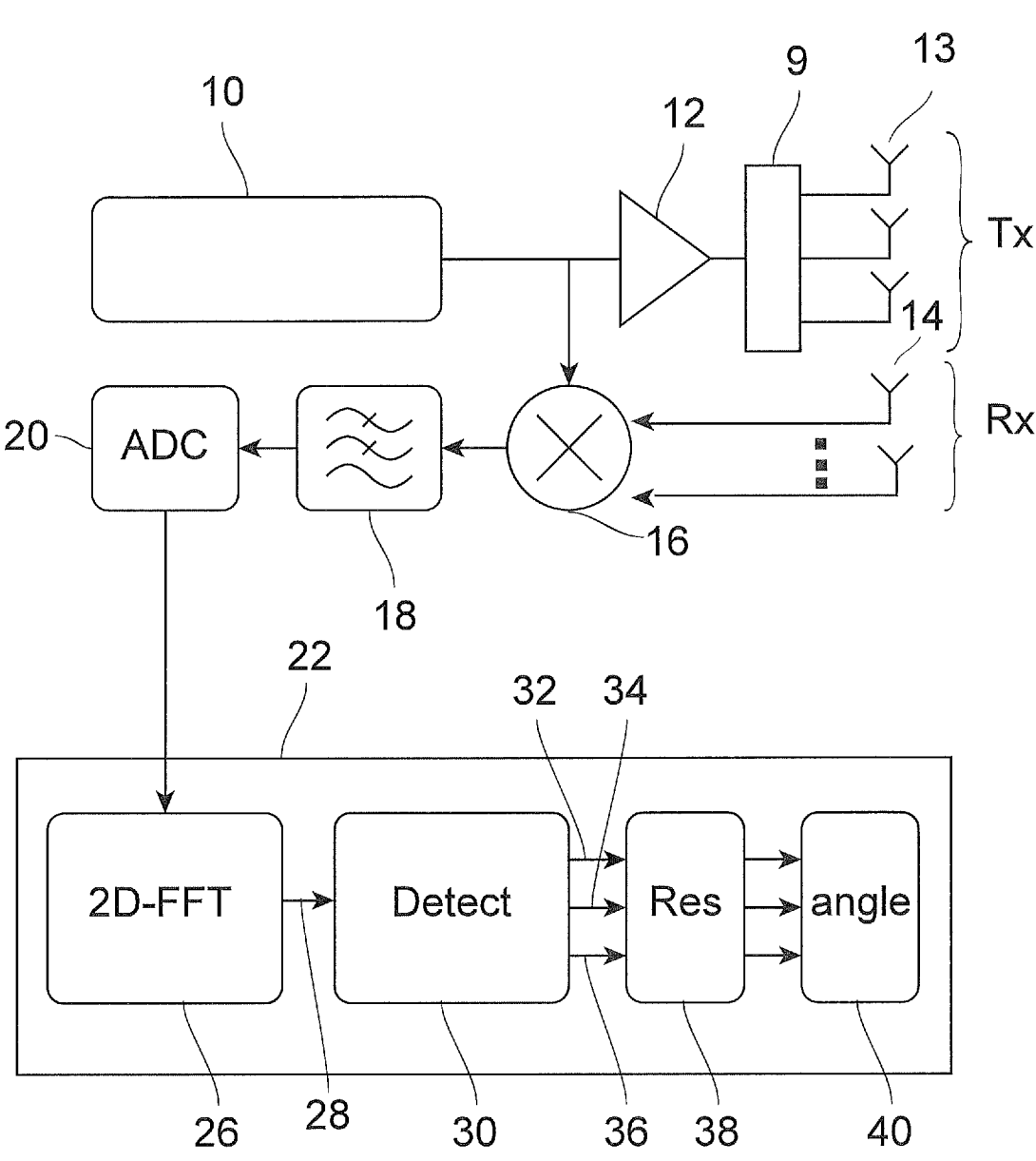
FIG. 1 is a block diagram of a MIMO radar sensor having a processor unit configured to resolve the Doppler ambiguities, in accordance with some embodiments of the present disclosure.

As shown in FIG. 1, a radar sensor may comprises a waveform generator 10 coupled to an amplifier 12 and a mixed 16, wherein the waveform generator 10 is configured to generate a frequency modulated transmission signal that is fed to an array of transmission antennas Tx 13 via the amplifier 12. In some embodiments, a switch 9 may be coupled to one or more transmit channels 15 configured to transmit modulated radar signals. In some embodiments, the switch 9 may be a single input multiple output multiplexer. Moreover, the one or more transmitter channels 15 may be coupled to an array of antennas in the Tx array 13. The output of the amplifier 12 may be coupled to the switch 9, wherein the switch 9 may selectively direct the transmission signal to different antennas in the Tx array 13. When the radar waves hit a target, they are reflected back towards the radar sensor and are received by an array of receiving antennas Rx 14, which may be coupled to one or more receive channels 17. The mixer 16 coupled to the one or more receive channels 17 may be configured to mix the received signals with a portion of the transmission signal generated by the waveform generator 10. The mixing results in a baseband signal with a beat frequency that is significantly lower than the frequency of the transmission signal. In some embodiments, the mixer 16 may be coupled to a band pass filter 18. In various embodiments, the band pass filter is coupled to an analog to digital converter 20. The mixed signals outputted from the mixer 16 are filtered in the band pass filter 18 and are subsequently converted into digital signals in the analog-to-digital converter 20. The digital signals are processed further in a processing unit 22.

Figure 2:
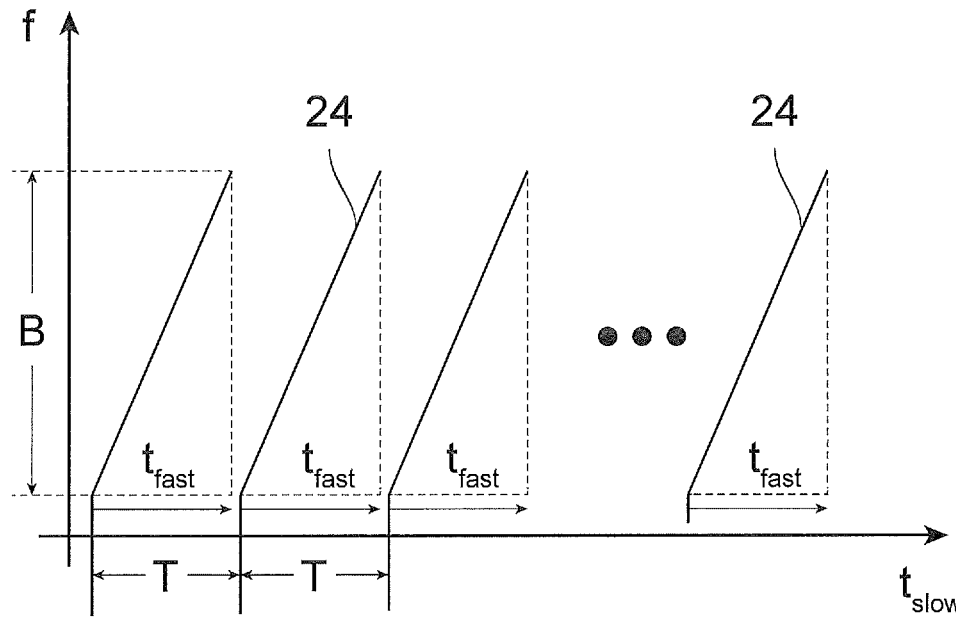
FIG. 2 is a frequency-time chart illustrating an exemplary modulation scheme, in accordance with some embodiments of the present disclosure.

Referring to FIG. 2, in some embodiments, the waveform of the transmission signal generated by the waveform generator 10 includes a sequence of frequency ramps 24, referred to herein as chirps. In each of these chirps, the frequency f of the generated waveform is a linear function of the time t, with the frequency varying within a frequency band B. All chirps 24 have equal slopes and are separated from each other by an equal repetition time interval T.

The received signal received at the Rx antennas comprises time-delayed and Doppler-shifted versions of the Tx signal. After the mixing step performed in the mixer 16, a sum of two-dimensional complex exponentials baseband signals are obtained at the output of the mixer 16. The signal of each individual target is called a beat signal and its frequency is proportional to the target delay as well as to the Doppler shift due to the target's relative motion. This dimension is referred to as fast-time $t_{fast}$. The second dimension is over the sequence of the chirps 24 and contains the Doppler frequencies. This dimension is referred to as slow-time $t_{slow}$.

Referring again to FIG. 1, the processing unit 22 comprises a two-dimensional Fourier transform (2D-FFT) block coupled to the ADC 20 and configured to is performed in a 2D-FFT on the digitized complex amplitudes of the baseband signal that are respectively sampled over the chirps 24 (FIG. 2). In some embodiments, the sampling frequency of the digitized complex amplitudes is the chirp repetition time interval T. The 2D-FFT block provides a range-Doppler spectrum 28 at its output, with signals for each target concentrated into a single peak. In some embodiments, a detection block 30 coupled to the 2D-FFT block 26, detects the peaks in the range-Doppler spectrum 28 and thereby identifies targets which occupy a specific range-Doppler cell. The detection stage 30 provides for each target a range index 32, a Doppler index 34, and the complex amplitude 36 of the signal at the peak that represents the target. Thus, after target detection, a list of targets is present for which their range and Doppler values are estimated from the indices of the peaks in the range-Doppler map.

According to the MIMO principle, the slow-time is split into code-time blocks during which different Tx antennas transmit, such that the signals of every Tx antenna can be distinguished at the receiver. The code-time blocks are repeated over time. Although the chirps in the successive blocks may be interleaved, the time intervals between two chirps that are sent by the same antenna are larger than the chirp repetition interval T shown in FIG. 2. As a consequence, the unambiguous Doppler range is reduced in the slow-time processing, resulting in Doppler ambiguities in the data provided by the detection stage 30.

In FIG. 1, the Doppler ambiguities are resolved in a Doppler ambiguity resolution block 38, which will be described in detail below in conjunction with FIGS. 3 to 8. Finally, the azimuth and elevation angles of each target are estimated in an angle estimation block 40, based on the phase relations between the Doppler-corrected signals from different pairs of transmission and receiving antennas. In some embodiments, the angle estimation block 40 is coupled to the Doppler ambiguity resolution block 38.

Figure 3:
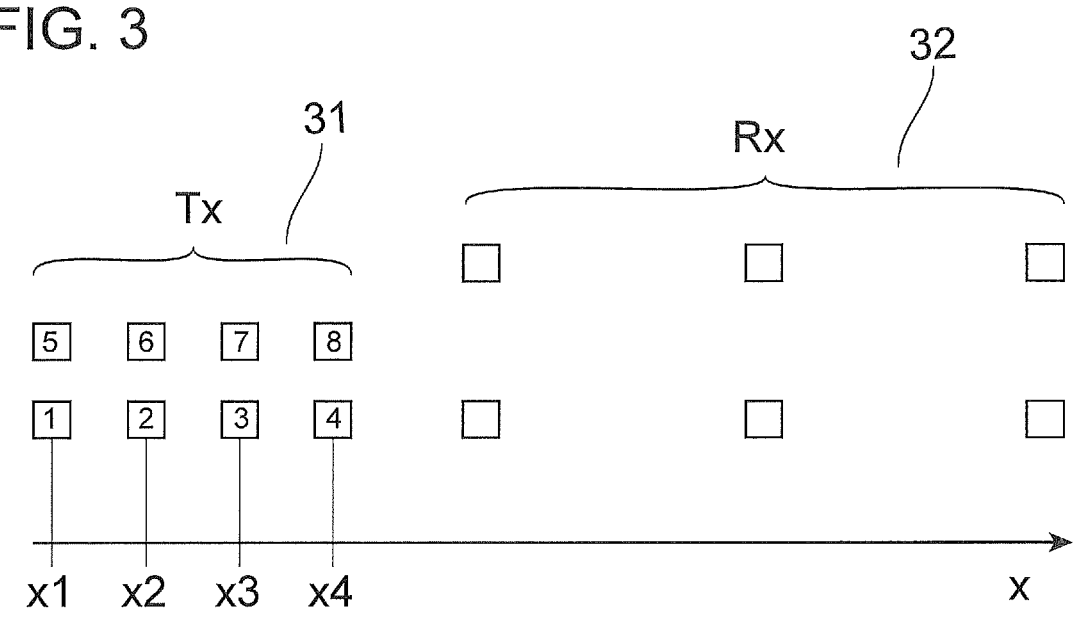
FIG. 3 is an example of an uniform linear antenna array of the MIMO radar sensor shown in FIG. 1, in accordance with some embodiments of the present disclosure.

FIG. 3 shows a simplified geometrical layout of an exemplary Tx 31 and Rx 32 antenna arrays referred in FIG. 1. In one embodiment, the transmission antennas 31 form two horizontal rows extending in a horizontal direction x. The transmission antennas 31 have been designated by an index n running from 1 to 8. The receiving antennas Rx 32 may also form two horizontal rows, but with a larger offset in the vertical direction. This permits an estimation of the azimuth and elevation angles of the targets.

In this example, the transmission antennas Tx 31 form a uniform linear array with a spatial separation of λ/2 between the individual antennas, with A being the mean wavelength of the transmission signal. The receiving antennas Rx 32 are also arranged with equal spacing which, however, are larger than the spacings between the transmission antennas. In some embodiments, the spacing between the receiving antennas Rx 32 may be as large as the size of the transmission antennas Tx 31 aperture. Consequently, a virtual array for unambiguous high resolution angle measurement can be established by switching between different combinations transmission and receiving antennas. It will be understood that the processing unit 22 (FIG. 1) has a plurality of parallel receiving channels each of which is associated with one of the receiving antennas Rx 32.

Figure 4:
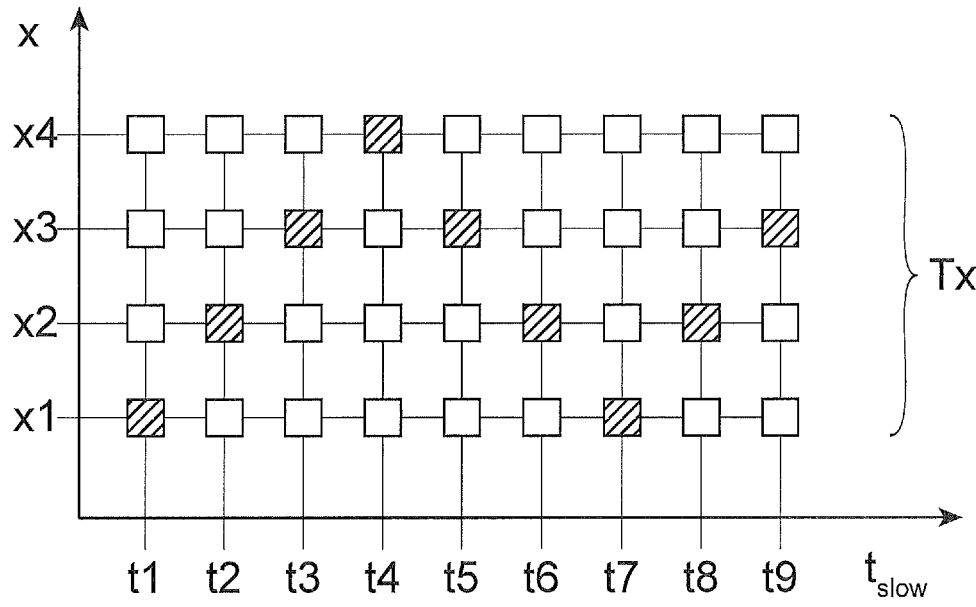
FIG. 4 is a diagram illustrating an example of a time division multiplex sequence, in accordance with some embodiments of the present disclosure.

FIG. 4 is a diagram illustrating an exemplary time multiplex scheme that may be utilized in the present invention. In one exemplary embodiment, the transmission antennas may be arranged in a single row. In FIGS. 4, x1, x2, x3, and x4 refer to antenna elements in the linearly arranged antenna array and t1 to t9 refer to time slots. Furthermore, in FIG. 3 shaded squares refer to the transmission antennas Tx that are active in each time slot t1 to t9. The horizontal axis in FIG. 4 represents the slow time $t_{slow}$ and the columns of squares in FIG. 4 indicate the x-positions (FIG. 3) and the active (shaded) or inactive (not hatched) state of the Tx antennas in each code-time slot t1 to t9. For example, between t1 and t2, the transmission signal is switched from the first antenna at position x1 to the next antenna at position x2, and between t2 and t3, the transmission signal is switched from the first antenna at position x2 to the next antenna at position x3, and so on. In a first multiplexing sequence comprising the code-time slots t1 to t4, the location of the active antenna moves in a first direction (e.g., x-direction in FIG. 3). In a second multiplexing sequence comprising the code-time slots t4 to t7, the location of the active antenna moves in a second direction, wherein the second direction (e.g., opposite to x-direction in FIG. 3) is opposite to the first direction. These transmission sequences are then repeated periodically.

When a detected target is moving (i.e., target has a non-zero velocity), the time delay between the signals sent at t1 and t2 results to a Doppler-induced phase progression, i.e., a Doppler shift that depends on both, the velocity of the target and the azimuth angle of the target. The same Doppler shift occurs between t2 and t3 and between t3 and t4. When the switching sequence is reversed between the code-time slots t4 and t7, the Doppler shift is induced that is equal in magnitude but opposite in sign.

Figure 5:
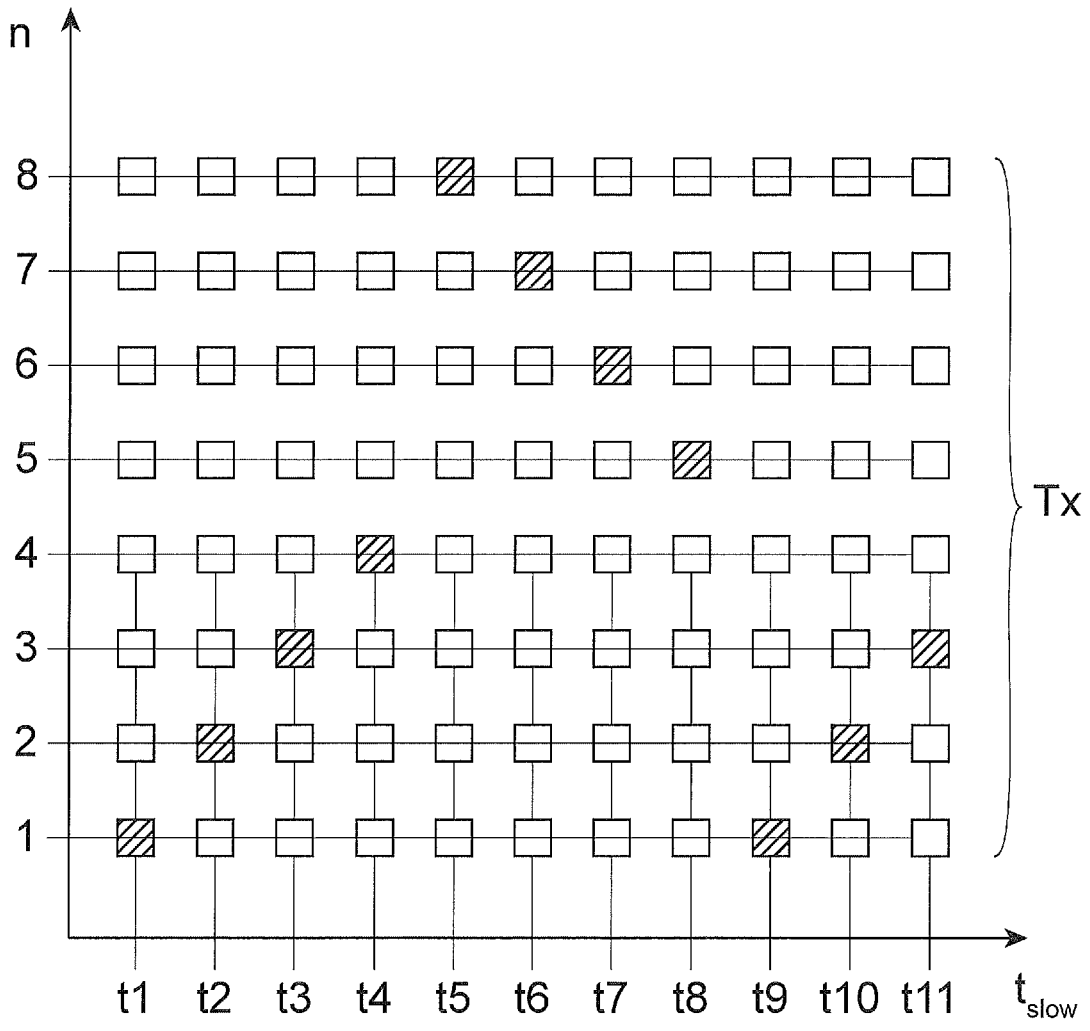
FIG. 5 is another diagram illustrating an example of a time division multiplex sequence used for the array shown in FIG. 3, in accordance with some embodiments of the present disclosure.

FIG. 5 is a diagram, analogous to FIG. 4, illustrating a time multiplexing scheme that may be utilized in a case where the transmission antennas Tx 13 (FIG. 1) are arranged in two rows, as shown in FIG. 3. Here, the vertical axis designates the indices n of the antennas. The transmission antennas 1 to 4 in the first of the two horizontal rows are used in the first and every odd-numbered multiplexing sequence whereas the antennas 5 to 8 in the upper row in FIG. 3 row are used in a second and every even-numbered multiplexing sequence. Since the x-spacings between the antennas are identical in both rows, switching between the two rows does not change the phase progressions within each individual multiplexing sequence. It does however induce a phase shift between successive multiplexing sequences, and since this shift is dependent upon the elevation angle of the target, the sampling of data for the elevation angle estimation can be efficiently combined with the sampling of data for the resolution of Doppler ambiguities.

Figure 6:
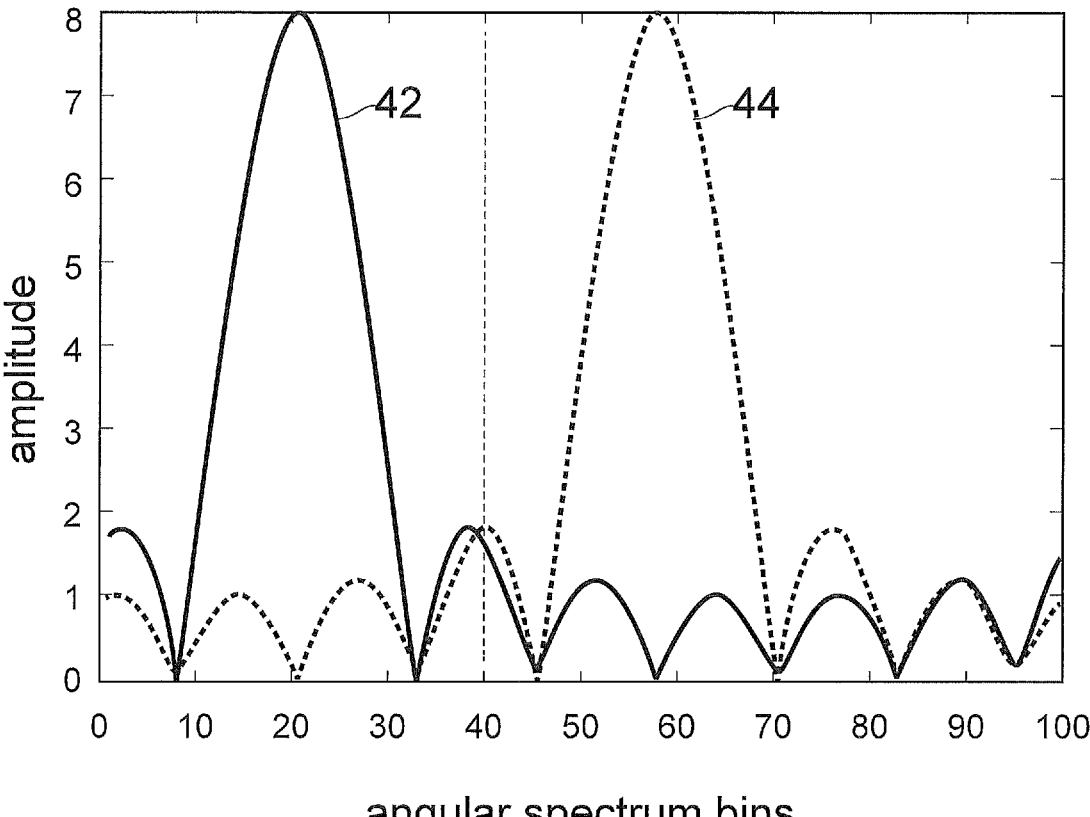
FIG. 6 shows two Doppler-shifted angular spectra, in accordance with some embodiments of the present disclosure.

FIG. 6 shows an example of two angular spectra 42 and 44 that may be obtained for a target having an angular position represented by an angular spectrum bin 40. The Doppler ambiguity can now be resolved by determining the amount of shift between the two spectra 42 and 44. This allows a Doppler ambiguity resolution independently from the angle estimation, as the angular spectra are merely shifted and not affected otherwise.

The two curves representing the spectra 42 and 44 shown in FIG. 6 express the complex amplitudes as functions of an angular frequency that is related to the azimuth angle of the target. Thus, each angular spectrum bin in FIG. 6 represents a certain angular frequency and, equivalently, a certain azimuth angle of the target. For a stationary target, there would be no Doppler shift and the spectra 42 and 44 would essentially be identical, with a maximum at the bin 40 corresponding to the true azimuth angle of the target. For a moving target, the offset between the maxima of the spectra 42 and 44 indicates a Doppler shift that can be determined unambiguously.

Various processing approaches to determine the Doppler ambiguity are possible. In the simplest realization, the shifted target peaks in the angular spectra can be detected and two corresponding frequency shifts can be estimated. The mean of these two frequency shifts constitutes the angular frequency (and hence the azimuth angle of the target), whereas half of their difference constitutes the Doppler frequency, and thus resolves the Doppler ambiguity.

Figure 7:
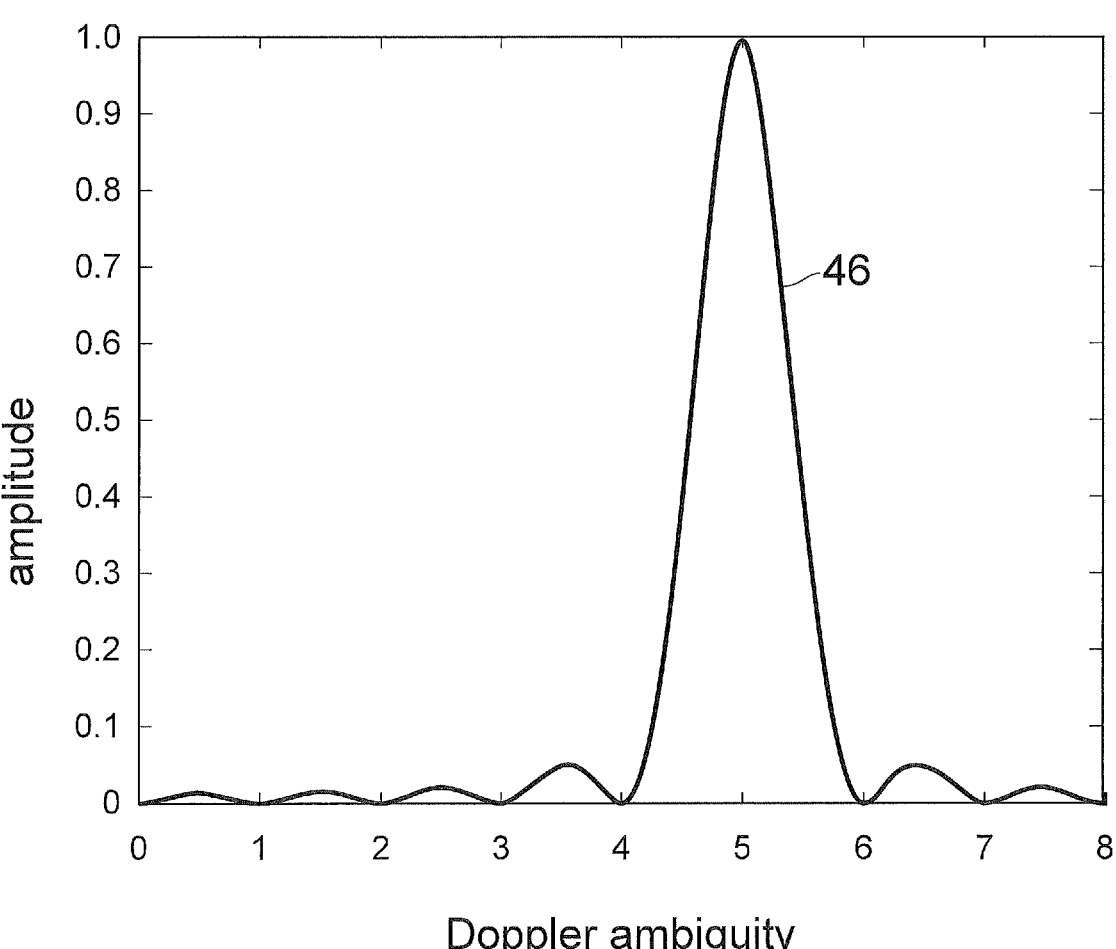
FIG. 7 is a Doppler ambiguity spectrum calculated from the spectra shown in FIG. 5, in accordance with some embodiments of the present disclosure.

Since the angular spectra are positively and negatively Doppler shifted, the amount of the Doppler shift can be determined based on a convolution of the Doppler-shifted angular spectra. Such convolution yields a Doppler spectrum 46 as shown in FIG. 7, with a peak at the Doppler frequency that represents the velocity of the target. Since an ambiguous Doppler estimation is already available from the slow-time processing in the 2D-FFT 26 and the Detect 30 blocks (FIG. 1), the convolution can be performed on and around the already known ambiguous Doppler value, i.e., for discrete points representing the Doppler ambiguities. The convolution can be linear or circular. The latter can be implemented efficiently as a fast convolution in the time domain, by elementwise multiplication of the two sequences. In other embodiments, the amount of Doppler shift may be determined by calculating separate angular spectra from the received signals that have been received from transmitting a plurality (e.g., more than two) different multiplex sequences and evaluating the shifted angular spectra for each received signal.

Once the Doppler ambiguity is resolved, correction of the Doppler induced shift of the angular spectra can be performed, followed by angular processing. Upon completion, for each detected radar target, the following data is obtained: the range, the unambiguous velocity, and the estimate of the angle which is not affected by Doppler shift.

Figure 8:
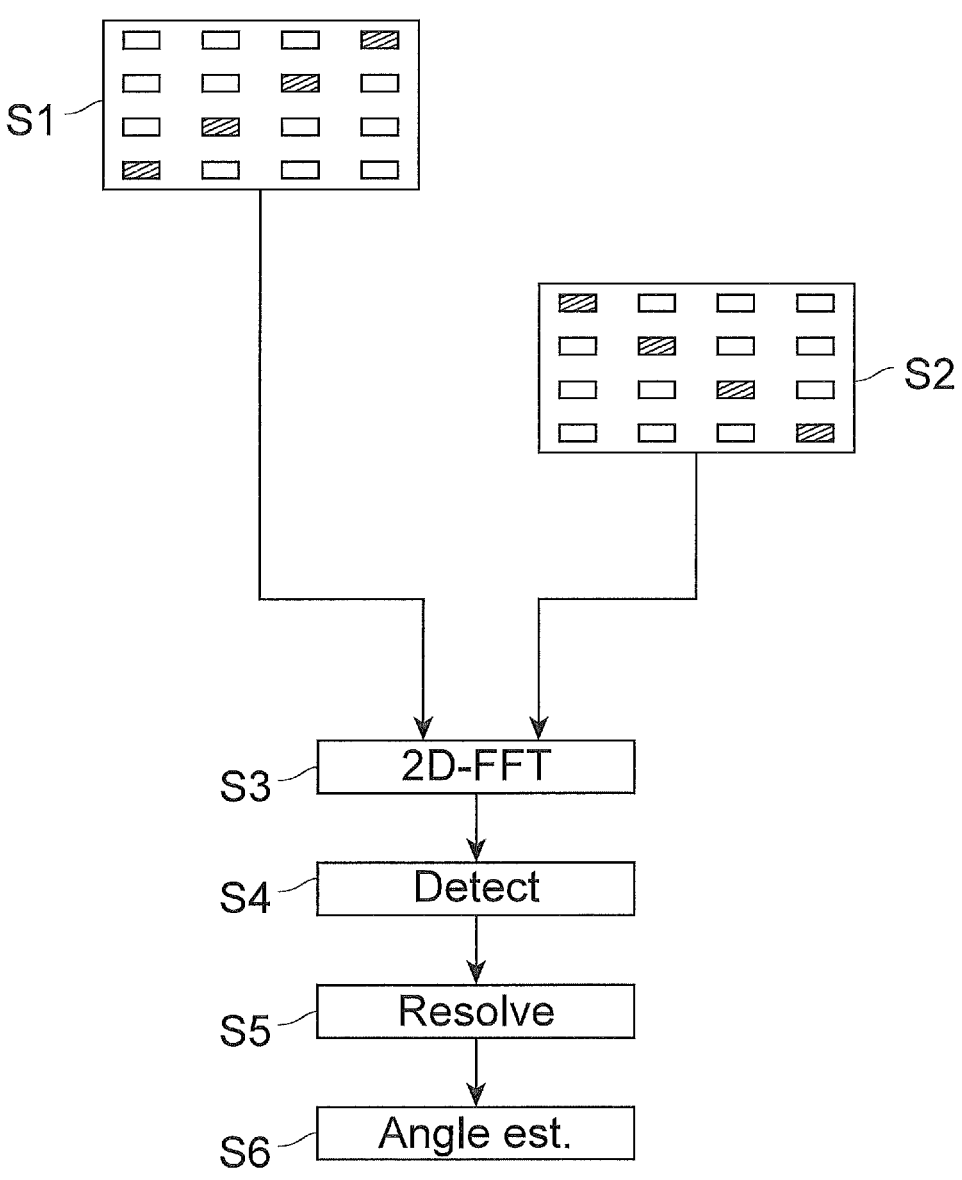
FIG. 8 is a flowchart of a method for operating multiple transmit channels to perform 2D-FFT for range-Doppler estimation, detection of radar targets in the range-ambiguous-Doppler spectra, resolution of Doppler ambiguities, and angular processing, in accordance with some embodiments of the present disclosure.

FIG. 8 is a flow diagram showing a method for determining range, unambiguous Doppler and angle of the radar targets, in accordance with some embodiments of the present disclosure. Step S1 comprises sending chirp sequences in accordance with a time multiplex scheme in which the location of the active Tx antenna is sequentially moved in a first direction. Step S2 comprises sending chirp sequences, but according to a second multiplex scheme in which the active Tx antenna is successively shifted in reverse direction. The chirp sequences sent in the first and second multiplex scheme are generated the wave generator 10 (FIG. 1) and the selection of active Tx antenna is accomplished by the switch 9 (FIG. 1).

The Rx signals resulting from the steps S1 and S2 are subjected to a two-dimensional FFT in step S3, the first dimension being a transformation in fast time within each chirp, and the second dimension being a transformation in slow time, i.e. over successive code-time blocks. In some embodiments, the two-dimensional FFT in step S3 is performed by the 2D-FFT block 26 (FIG. 1). Of course, the processing of the signals from step S1 can start already in Step S2 while step S2 is still running. Step S4 detects targets in the range-Doppler map resulting from step S3 and assigning to each target a range value and a Doppler value which, however, is ambiguous due to multiplexing. In some embodiments, the steps S3 and S4 may be performed in parallel with another step S1 of a subsequent measurement cycle.

Step S5 resolves the Doppler ambiguity for each detected target by calculating the angular spectra 42 and 44 and convolving them. In some embodiments, the step S5 may be performed by the Doppler ambiguity resolution block 38. The angle estimation is performed separately from step S5 in step S6. In some embodiments, the step S6 is performed by the angle estimation block 40.

Figure 9:
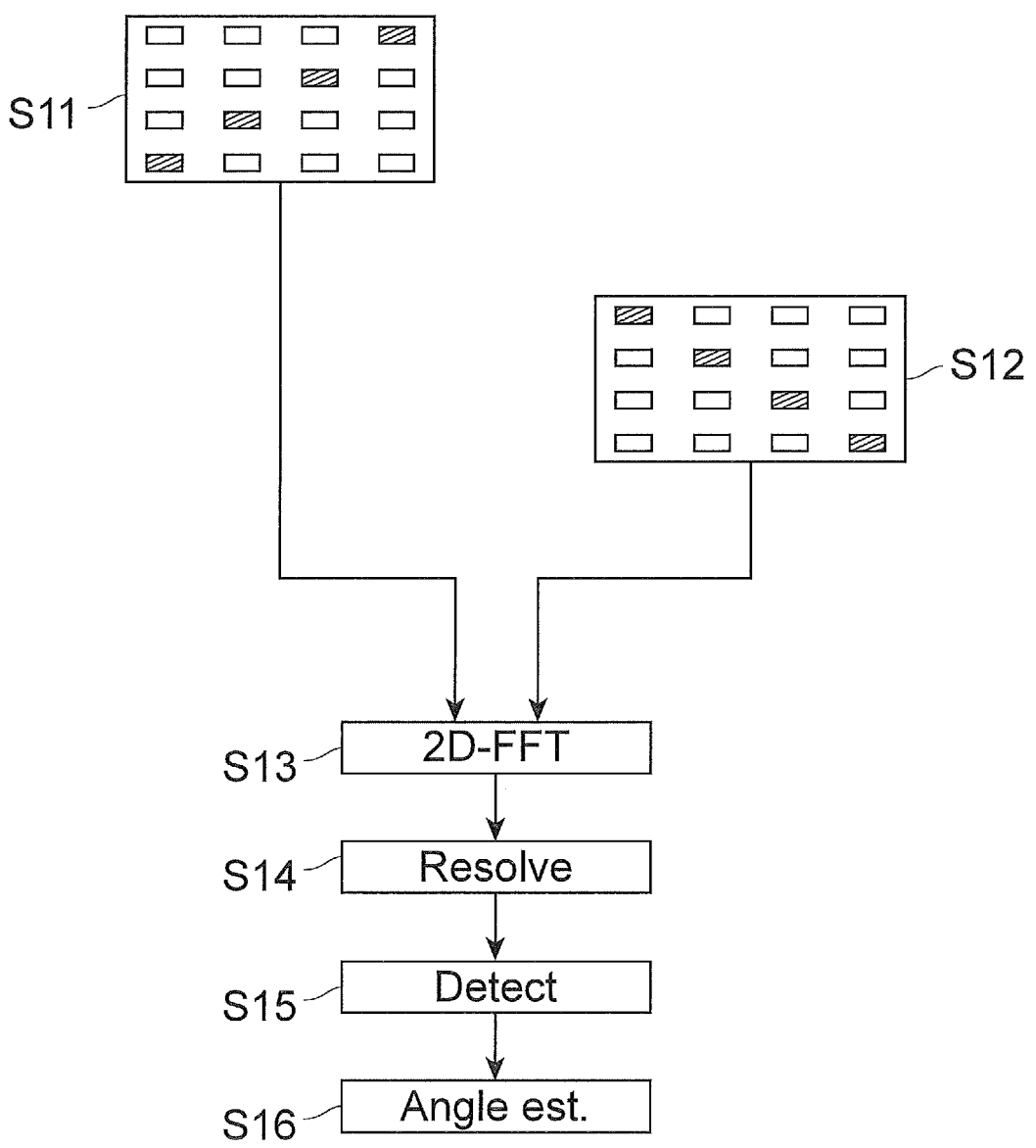
FIG. 9 is a flow diagram of a method for signal processing in the MIMO radar, where the resolution of Doppler ambiguities is performed before the detection of radar targets in the range-ambiguous-Doppler spectra and angular processing, in accordance with other embodiments of the present disclosure.

FIG. 9 is a flow diagram for another embodiment in which the order of the steps of target detection and Doppler ambiguity resolution is reversed. Steps S11, S12, and S13 are identical with steps S1, S2, and S3. In the exemplary embodiment shown in FIG. 9, the step S13 performing the two dimensional Fourier transform is followed by the step S14 performing the Doppler ambiguity resolution. Since the targets have not yet been detected at step 14, the Doppler ambiguity resolution method (e.g., calculating the angular spectra 42 and 44 (FIG. 6) and convolving them) is performed for each range-Doppler cell in the spectra obtained in step S13. Only then will the targets be detected in step S15, with unambiguous Doppler values being assigned to each target. Step S16 is the angle estimation step equivalent to step S6.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed, instructed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method of determining a relative radial velocity of at least one radar target comprising:
   transmitting repeatedly a first multiplexed sequence comprising a first plurality of modulated transmission signals exhibiting a first predetermined spread, wherein each modulated transmission signal from the first plurality of modulated transmission signals is assigned to transmission channels according to a first assignment pattern;
   transmitting repeatedly a second multiplexed sequence comprising a second plurality of modulated transmission signals exhibiting a second predetermined spread, wherein each modulated transmission signal from the second plurality of modulated transmission signals is assigned to transmission channels according to a second assignment pattern, wherein the first predetermined spread is different from the second predetermined spread, wherein the predetermined spreads are in at least one of a time, frequency, and phase domain, and wherein differences between the first predetermined spread and the second predetermined spread result in Doppler-induced phase progression differences; and
   inferring a velocity of the at least one radar target from the differences of the Doppler-induced phase progressions between the first and the second multiplexed sequences.

2. The method of claim 1, wherein the first and second plurality of modulated transmission signals are time division multiplexed on the transmission channels.

3. The method of claim 1, wherein the first and second plurality of modulated transmission signals are code division multiplexed on the transmission channels.

4. The method of claim 1, comprising a step of detecting the at least one radar target with ambiguous Doppler shifts in a range-Doppler map obtained by two-dimensional Fourier transformation of received radar signals and a step of resolving the ambiguous Doppler shifts by calculating differences in the determined Doppler-induced phase progressions.

5. The method of claim 1, further comprising:
   forming a range-Doppler map by two-dimensional Fourier transformation of received signals;
   using a difference in phase progression between the multiplex sequences for resolving Doppler ambiguities in each range-Doppler cell of the map; and
   detecting the at least one radar target in the range-Doppler map, wherein the range-Doppler map includes the radar targets with the resolved Doppler ambiguities.

6. The method of claim 1, wherein the first multiplex sequence is designed to induce a first phase progression between the transmission channels in a first direction and the second multiplex sequence is designed to induce a second phase progression between the transmission channels in a second direction opposite to the first direction.

7. The method of claim 6, wherein the first and second phase progressions are linear.

8. The method of claim 1, wherein the spreads between successive modulated transmissions are equidistant and are different for the first and the second multiplexing sequences.

9. The method of claim 1, further comprising:

calculating two separate angle spectra from each received signal that has been received by a radar sensor due to reflections by the at least one radar target of the first and second multiplexed sequences, and evaluating a frequency shift between the two separate angle spectra.

10. The method of claim 9, further comprising calculating a convolution of the two separate angle spectra.

11. The method according to claim 1, wherein the first and second multiplex sequences are sent from distinct rows of a transmission antenna array, wherein the distinct rows are parallel to one another and antennas in the transmission antenna array exhibit identical antenna-to-antenna spacings.

12. A radar system comprising:

a waveform generator coupled to an amplifier and configured to generate a frequency modulated transmission signal that is fed to an array of transmission antennas via the amplifier; and a switch coupled to the amplifier and configured to generate a first and second multiplexed sequences comprising of a first and second plurality of modulated transmission signals, the first plurality of modulated transmission signals exhibiting a first predetermined spread and the second plurality of modulated transmission signals exhibiting a second predetermined spread, wherein each modulated transmission signal from the first and second plurality of modulated transmission signals are assigned by the switch to transmission channels according to a first and second assignment patterns and the first predetermined spread is different from the second predetermined spread, and differences between the first predetermined spread and the second predetermined spread result in Doppler-induced phase progression differences;

a signal processing block configured to determine a velocity of the at least one radar target from the differences of Doppler-induced phase progressions between the first and the second multiplexed sequences.

13. The radar system of claim 12, wherein the radar system is a multiple-input multiple-output (MIMO) radar.

14. The radar system of claim 12, wherein the radar system is a cooperative radar sensor network.

15. The radar system of claim 12, wherein the radar system is a chirp sequence radar system.

16. The radar system of claim 12, wherein the array of transmission antennas comprises at least one uniform linear array.

17. The radar system of claim 12, the first and second plurality of modulated transmission signals are time division multiplexed on the transmission channels.

18. The radar system of claim 12, the first and second plurality of modulated transmission signals are code division multiplexed on the transmission channels.

19. The radar system of claim 12, further comprising a step of calculating separate angle spectra from received signals of different multiplex sequences, and a step of evaluating a frequency shift between the separate angle spectra.

20. The radar system of claim 12, wherein a Doppler ambiguity resolution module estimates the relative radial velocity of the at least one radar target by performing a convolution of two angle spectra.

* * * * *